US012767498B2

(12) United States Patent
Lawson et al.

(10) Patent No.: US 12,767,498 B2
(45) Date of Patent: Oct. 20, 2026

(54) WINCH ASSEMBLY WITH STEPPED BORES

(71) Applicant: Caterpillar Inc., Peoria, IL (US)

(72) Inventors: Sean D. Lawson, East Peoria, IL (US); Benjamin Barbier, Grenoble (FR); Simon Tabutin, Saint Marcel en Murat (FR)

(73) Assignee: Caterpillar Inc., Peoria, IL (US)

( * ) Notice: Subject to any disclaimer, the term of this patent is extended or adjusted under 35 U.S.C. 154(b) by 636 days.

(21) Appl. No.: 18/310,724

(22) Filed: May 2, 2023

(65) Prior Publication Data

US 2024/0367952 A1 Nov. 7, 2024

(51) Int. Cl.

| | |
|---|---|
| ***B66D 1/26*** | (2006.01) |
| ***B66C 23/44*** | (2006.01) |
| ***B66D 1/12*** | (2006.01) |
| ***B66D 1/22*** | (2006.01) |
| ***B66D 1/28*** | (2006.01) |
| *F16L 1/028* | (2006.01) |

(52) U.S. Cl.

CPC ................ *B66D 1/26* (2013.01); *B66C 23/44* (2013.01); *B66D 1/12* (2013.01); *B66D 1/22* (2013.01); *B66D 1/28* (2013.01); *F16L 1/028* (2013.01)

(58) Field of Classification Search

CPC ... B66D 1/26; B66D 1/12; B66D 1/22; B66D 1/28; B66C 23/44; F16L 1/028

See application file for complete search history.

(56) References Cited

U.S. PATENT DOCUMENTS

| | | | | |
|---|---|---|---|---|
| 4,135,681 | A | 1/1979 | Cooper | |
| 4,196,889 | A | 4/1980 | Dudek | |
| 10,773,931 | B2 | 9/2020 | Pletz et al. | |
| 10,889,475 | B2 * | 1/2021 | Haley | B66D 1/38 |
| 2006/0245888 | A1 * | 11/2006 | Dietz | B66C 23/44 414/563 |
| 2014/0084229 | A1 * | 3/2014 | Morrison | B66D 3/006 254/344 |
| 2014/0262693 | A1 * | 9/2014 | de Lore | B66D 5/34 198/813 |
| 2016/0068376 | A1 * | 3/2016 | Fretz | B66D 3/18 254/219 |

(Continued)

FOREIGN PATENT DOCUMENTS

| | | | | |
|---|---|---|---|---|
| CN | 111620253 A | * | 9/2020 | B66D 1/12 |
| CN | 111620253 B | | 4/2023 | |

(Continued)

*Primary Examiner* — Faris S Almatrahi
*Assistant Examiner* — Nathaniel L Adams

(57) ABSTRACT

A winch assembly may include a frame including a first plate and a second plate separated from the first plate. The frame may have a set of stepped bores including a first bore in the first plate and a second bore, co-axial with the first bore, in the second plate. The first bore may be larger than the second bore. The winch assembly may include a winch disposed in the frame through the first bore and the second bore. The winch may include a first housing with a first flange extending from the first housing, the first flange connected at an outward surface of the first plate. The winch may include a second housing with a second flange extending from the second housing, the second flange connected at an inward surface of the second plate. The winch may include a drum between the first housing and the second housing.

20 Claims, 7 Drawing Sheets

(56) References Cited

U.S. PATENT DOCUMENTS

| | | | | |
|---|---|---|---|---|
| 2019/0352148 | A1* | 11/2019 | Fanello | B66C 23/44 |
| 2023/0109258 | A1 | 4/2023 | Caldwell et al. | |

FOREIGN PATENT DOCUMENTS

| | | | |
|---|---|---|---|
| DE | 69736199 | T2 | 5/2007 |
| DE | 102015011327 | A1 | 3/2016 |
| DE | 102022125540 | A1 | 5/2023 |

* cited by examiner

WINCH ASSEMBLY WITH STEPPED BORES

TECHNICAL FIELD

The present disclosure relates generally to winches and, for example, to a winch assembly with stepped bores.

BACKGROUND

Pipelayer machines are used for installing large, heavy lengths of conduit into or above ground. Such conduits may be used, for example, to carry oil or gas from remote well locations over vast distances to a receiving station or refinery. Accordingly, transportation costs for shipping, trucking, or otherwise moving the oil or gas can be avoided. In addition to petroleum pipelines, pipelayer machines can also be used to install piping for other materials, or for installing of drain tile, culverts, or other irrigation and drainage infrastructure.

A pipelayer machine may utilize one or more winches to perform hoisting operations. The winches can be supported in a frame that is mounted to the pipelayer machine. However, accessing and/or removing a winch from the frame for repair or replacement may be difficult once the frame is mounted to the pipelayer machine. For example, to remove a winch from the frame, the frame may need to be disconnected from the pipelayer machine to permit access to an underside of the frame, and/or the winch may need to be disassembled and removed in multiple sections from the frame. This process is complex and time consuming, may require specialized tooling, and leads to significant machine downtime.

The winch assembly of the present disclosure solves one or more of the problems set forth above and/or other problems in the art.

SUMMARY

A winch assembly may include a frame including a first plate and a second plate separated from the first plate. The frame may have a set of stepped bores including a first bore in the first plate and a second bore, co-axial with the first bore, in the second plate. The first bore may be larger than the second bore. The winch assembly may include a winch disposed in the frame through the first bore and the second bore. The winch may include a first housing with a first flange extending from the first housing, the first flange connected at an outward surface of the first plate. The winch may include a second housing with a second flange extending from the second housing, the second flange connected at an inward surface of the second plate. The winch may include a drum between the first housing and the second housing.

A winch may include a gear housing with a first flange of a first maximum diameter extending from the gear housing, the gear housing including reduction gears. The winch may include an input housing with a second flange of a second maximum diameter, different from the first maximum diameter, extending from the input housing, the input housing including an input coupling coupled to the reduction gears. The winch may include a drum, between the gear housing and the input housing, having a barrel, a first collar at a first end of the barrel, and a second collar at a second end of the barrel. The winch may include a tie element connecting the second flange of the input housing and the second collar of the drum.

A pipelayer machine may include a boom, a hook suspended from the boom, and a winch assembly. The winch assembly may include a frame include a first plate and a second plate separated from the first plate. The frame may have a first set of stepped bores including a first bore in the first plate and a second bore, co-axial with the first bore, in the second plate. The first bore may be larger than the second bore. The frame may have a second set of stepped bores including a third bore in the first plate and a fourth bore, co-axial with the third bore, in the second plate. The third bore may be larger than the fourth bore. The winch assembly may include a hook winch disposed in the frame through the first set of stepped bores, the hook winch configured to raise and to lower the hook. The winch may include a boom winch disposed in the frame through the second set of stepped bores, the boom winch configured to raise and to lower the boom.

DETAILED DESCRIPTION

This disclosure relates to a winch assembly, which is applicable to any machine that uses one or more winches (e.g., for hoisting, loading, or the like). For example, the machine may be a pipelayer machine or another earth moving or construction machine including, but not limited to, a compactor machine, a paving machine, a cold planer, a grading machine, a backhoe loader, a wheel loader, a harvester, an excavator, a motor grader, a skid steer loader, a tractor, a dozer, a lift truck, a cherry-picker machine, a forklift, or any other machine configured to lift a load at a distance from a main body of the machine. In some implementations, the machine may be a vehicle (e.g., a tow truck), a boat, or an aircraft, among other examples.

Figure 1:
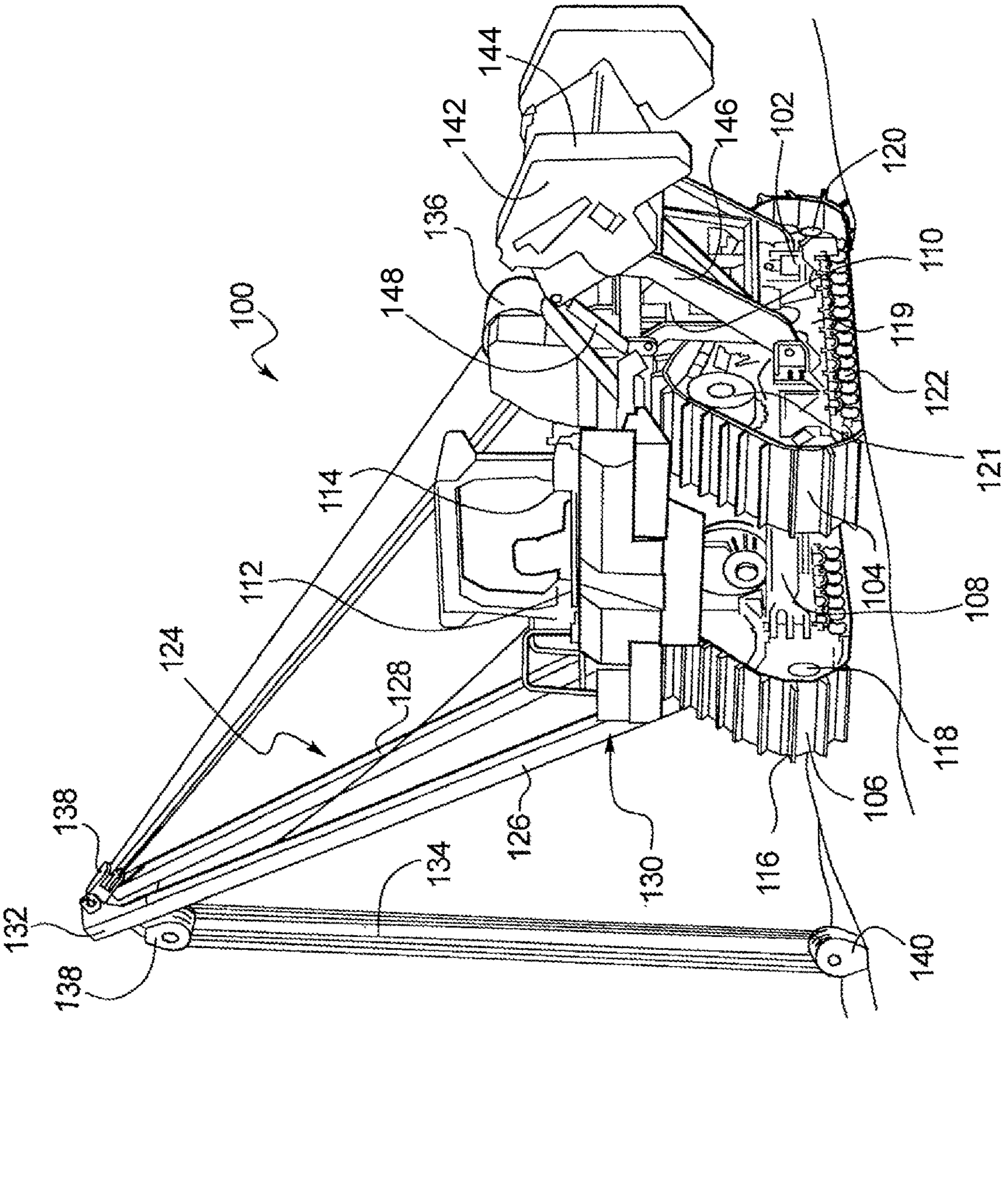
FIG. 1 is a diagram of an example pipelayer machine.

FIG. 1 is a diagram of an example pipelayer machine 100. The pipelayer machine 100 may include an undercarriage 102 including first and second drive tracks 104, 106 supporting a chassis 108. In some examples, wheels or other ground engaging members may be used additionally, or alternatively, to drive tracks 104, 106. Each of the drive tracks 104, 106 may be composed of a series of interlinked track shoes 116. As shown, the drive tracks 104, 106 may be trained around first and second idlers 118, 120 supported by a track roller frame 119, a sprocket 121, and a series of other rollers 122.

A power source 110 is supported by the chassis 108. The power source 110 may include an internal combustion engine (e.g., powered by a fuel, such as diesel, gasoline, and/or natural gas), one or more battery packs, and/or one or more fuel cells, among other examples. An operator seat 112 and control console 114 may also be supported by the chassis 108 from which an operator may control one or both drive tracks 104, 106 to drive the pipelayer machine 100.

Extending relative to the undercarriage 102 is a boom 124. The boom 124 may include first and second legs 126, 128 independently hinged to the undercarriage 102 at a base 130, and which terminate at a joined tip 132. A lifting cable(s) 134 extends from a winch assembly 136 through a series of pulleys 138 at the boom tip 132 and terminates in a grapple hook 140 suspended from the boom 124, or another mechanism for wrapping around or otherwise securing to a pipe to be lifted.

In some examples, a counterweight 142 may extend in a direction laterally opposite to the boom 124. The counterweight 142 may be include a series of heavy plates 144 secured to a counterweight frame 146. The counterweight frame 146 may be hingedly attached to the undercarriage 102 and/or the chassis 108 and movable between a retracted position, a deployed position, or another position therebetween by way of a hydraulic cylinder 148, or the like. Movement of the counterweight 142 may adjust the center of gravity of the pipelayer machine to balance the pipelayer machine 100.

As indicated above, FIG. 1 is provided as an example. Other examples may differ from what is described with regard to FIG. 1.

Figure 2:
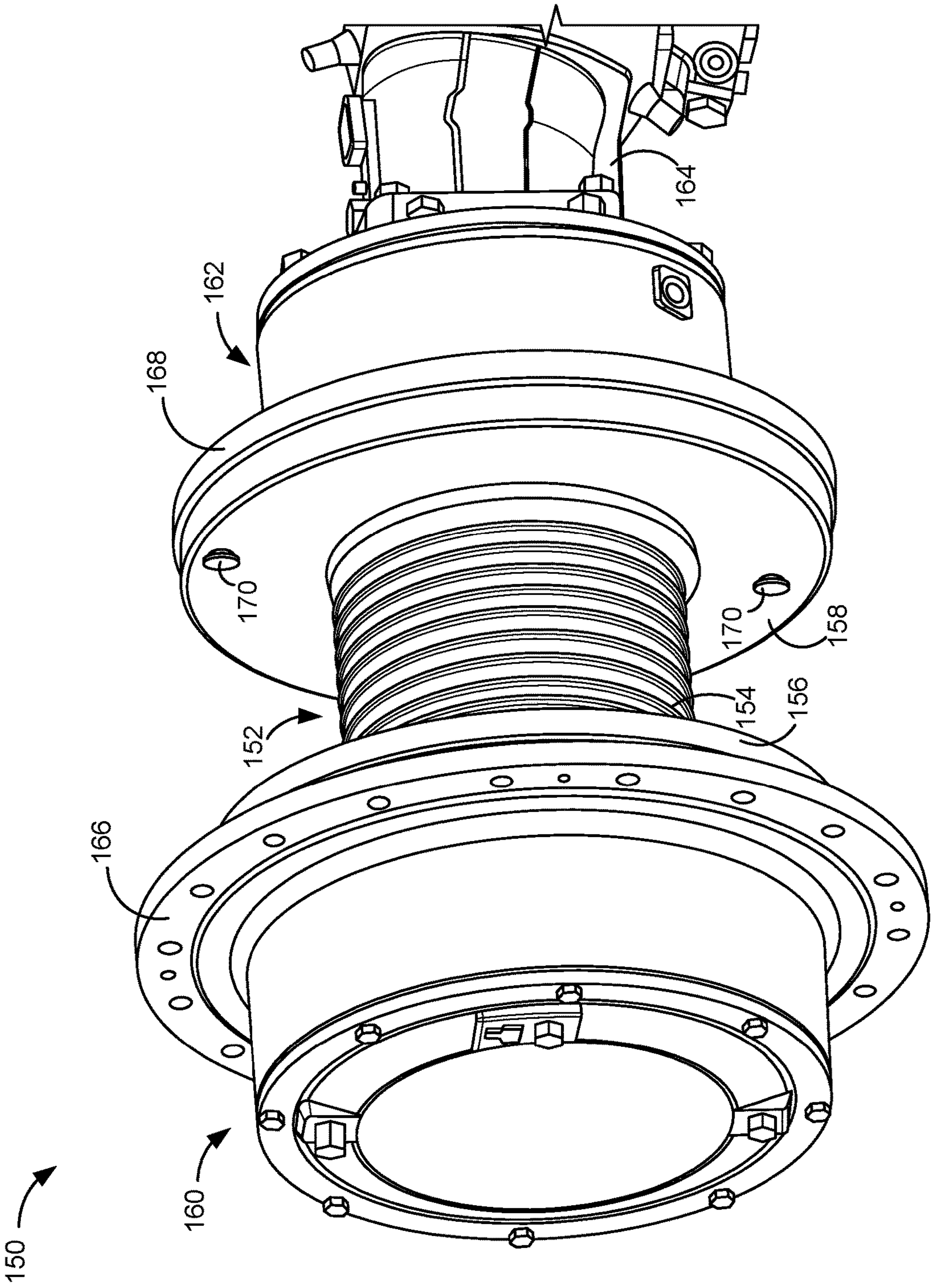
FIG. 2 is a diagram of an example winch of a winch assembly.

FIG. 2 is a diagram of an example winch 150 of the winch assembly 136. The winch 150 includes a drum 152 around which cable (e.g., cable 134) may be wound or unwound. The drum 152 includes a barrel 154, a first collar 156 (e.g., a flange) at a first end of the barrel 154, and a second collar 158 (e.g., a flange) at a second end of the barrel 154. The drum 152 is between a gear housing 160 and an input housing 162 (i.e., first and second housings) of the winch 150. A motor 164, or another source of motive power, may be connected to the input housing 162. The motor 164 may be configured to drive the drum 152.

The gear housing 160 may include a first flange 166 extending from the gear housing 160 (e.g., from an inward end of the gear housing 160). For example, the first flange 166 may abut the first collar 156 of the drum 152. The input housing 162 may include a second flange 168 extending from the input housing 162 (e.g., from an inward end of the input housing 162). For example, the second flange 168 may abut the second collar 158 of the drum 152.

One or more tie elements 170 (e.g., bolts) may connect the second flange 168 of the input housing 162 and the second collar 158 of the drum 152. For example, the second flange 168 may have an aperture aligned with an aperture in the second collar 158, and a tie element 170 may extend through the apertures to secure the input housing 162 to the drum 152. The tie elements 170 may connect the second flange 168 and the second collar 158 to facilitate removal or insertion of the winch 150 from or to the winch assembly (as described herein) as a single unit, and the tie elements 170 may be removed, or otherwise disconnected, from the second flange 168 and the second collar 158 while the winch 150 is in the winch assembly 136 (e.g., when the winch 150 is not being moved). In some implementations, the gear housing 160 may connect to the drum 152 by an internal or external connection mechanism. For example, the drum 152 may include a projecting portion that extends into the gear housing 160 and connects the drum 152 to the gear housing. As described in connection with FIG. 6, a shaft disposed within the projecting portion may couple one or more gears of the drum 152 with one or more gears of the gear housing 160 to enable rotation of the drum 152. Additionally, or alternatively, the gear housing 160 may connect to the drum 152 via one or more tie elements connecting the first flange 166 of the gear housing 160 and the drum 152, in a similar manner as described above. In this way, the winch 150 may be moved as a single unit. A tie bar connecting the gear housing 160 and the input housing 162 may be absent from the winch 150.

As indicated above, FIG. 2 is provided as an example. Other examples may differ from what is described with regard to FIG. 2.

Figure 3:
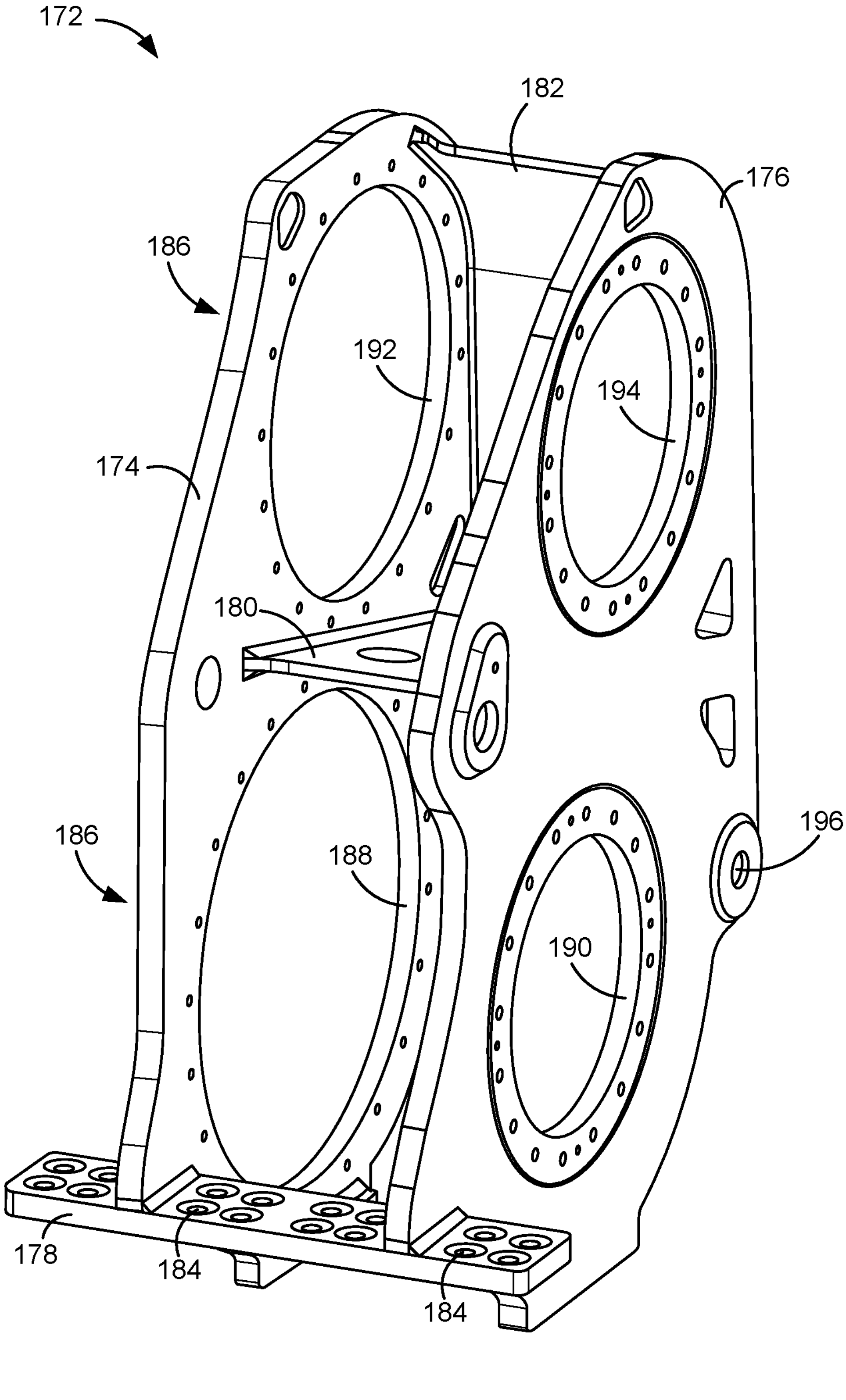
FIG. 3 is a diagram of an example frame of a winch assembly.

FIG. 3 is a diagram of an example frame 172 of the winch assembly 136. The frame 172 is configured to support one or more winches 150. The frame 172 includes a first plate 174 and a second plate 176. The second plate 176 may be arranged parallel to the first plate 174 and separated (e.g., spaced) from the first plate 174 to define an interior area between the first plate 174 and the second plate 176. The first plate 174 and the second plate 176 may be similarly sized and shaped or may be differently sized and shaped. The first plate 174 and the second plate 176 may be composed of steel, alloy steel, or another rigid material.

The first plate 174 and the second plate 176 may be connected by a mounting plate 178, a partition plate 180, and/or a back wall 182. The mounting plate 178 extends orthogonally between the first plate 174 and the second plate 176, and may overhang the first plate 174 and/or the second plate 176. The first and second plates 174, 176 may each be notched to define flat-edged portions of the first and second plates 174, 176, and the mounting plate 178 may be connected to the first and second plates 174, 176 at the flat-edged portions. The mounting plate 178 may have a plurality of apertures 184 (e.g., six or more apertures 184, ten or more apertures 184, or the like) through the mounting plate configured to receive fasteners (e.g., bolts) to mount the winch assembly 136 to the machine 100. The partition plate 180 extends orthogonally to the first plate 174 and the second plate 176 across the interior area defined between the first and second plates 174, 176, thereby defining upper and lower chambers of the interior area. The back wall 182 at least partially encloses the interior area.

The frame 172 may have one or more (e.g., multiple) sets of stepped bores 186. For example, a set of stepped bores 186 may include a first bore 188 in the first plate 174 and a second bore 190 in the second plate 176. The first bore 188 may be larger than the second bore 190. The first plate 174 may fully enclose the first bore 188, and the second plate 176 may fully enclose the second bore 190. The first bore 188 and the second bore 190 may be circular. Moreover, the first bore 188 and the second bore 190 may be co-axial. The first bore 188 has a first area, and the second bore 190 has a second area that is less than the first area. For example, the first bore 188 has a first diameter (e.g., minimum diameter), and the second bore 190 has a second diameter (e.g., minimum diameter) different from the first diameter (e.g., less than the first diameter). In some examples, the first bore 188 and/or the second bore 190 may not be round, in which case, "diameter" may refer to width (e.g., minimum width) of the first bore 188 and/or the second bore 190.

In some implementations, the first plate 174 may include a third bore 192 and the second plate 176 may include a fourth bore 194 of an additional set of stepped bores 186. The first bore 188 and the second bore 190 may lead into the lower chamber of the interior area of the frame 172 (e.g., at a first side of the partition plate 180), and the third bore 192 and the fourth bore 194 may lead to the upper chamber of the interior area of the frame 172 (e.g., at a second side of the partition plate 180). A dimensional relationship of the third bore 192 and the fourth bore 194 may be similar to that of the first bore 188 and the second bore 190 described above. The first bore 188 and the third bore 192 may correspond to each other in size and shape or may differ from each other in size and/or shape (e.g., the third bore 192 may have a lesser diameter than the diameter of the first bore 188). Additionally, or alternatively, the second bore 190 and the fourth bore 194 may correspond to each other in size and shape or may differ from each other in size and/or shape.

The frame 172 may have one or more pin apertures 196 in the first plate 174 and/or in the second plate 176. For example, a first pin aperture 196 (not visible in FIG. 3) may be in the first plate 174 and a second pin aperture 196 may be in the second plate 176. A pin aperture 196 may be configured to receive a pin to mount the winch assembly 136 to the machine 100.

As indicated above, FIG. 3 is provided as an example. Other examples may differ from what is described with regard to FIG. 3.

Figure 4:
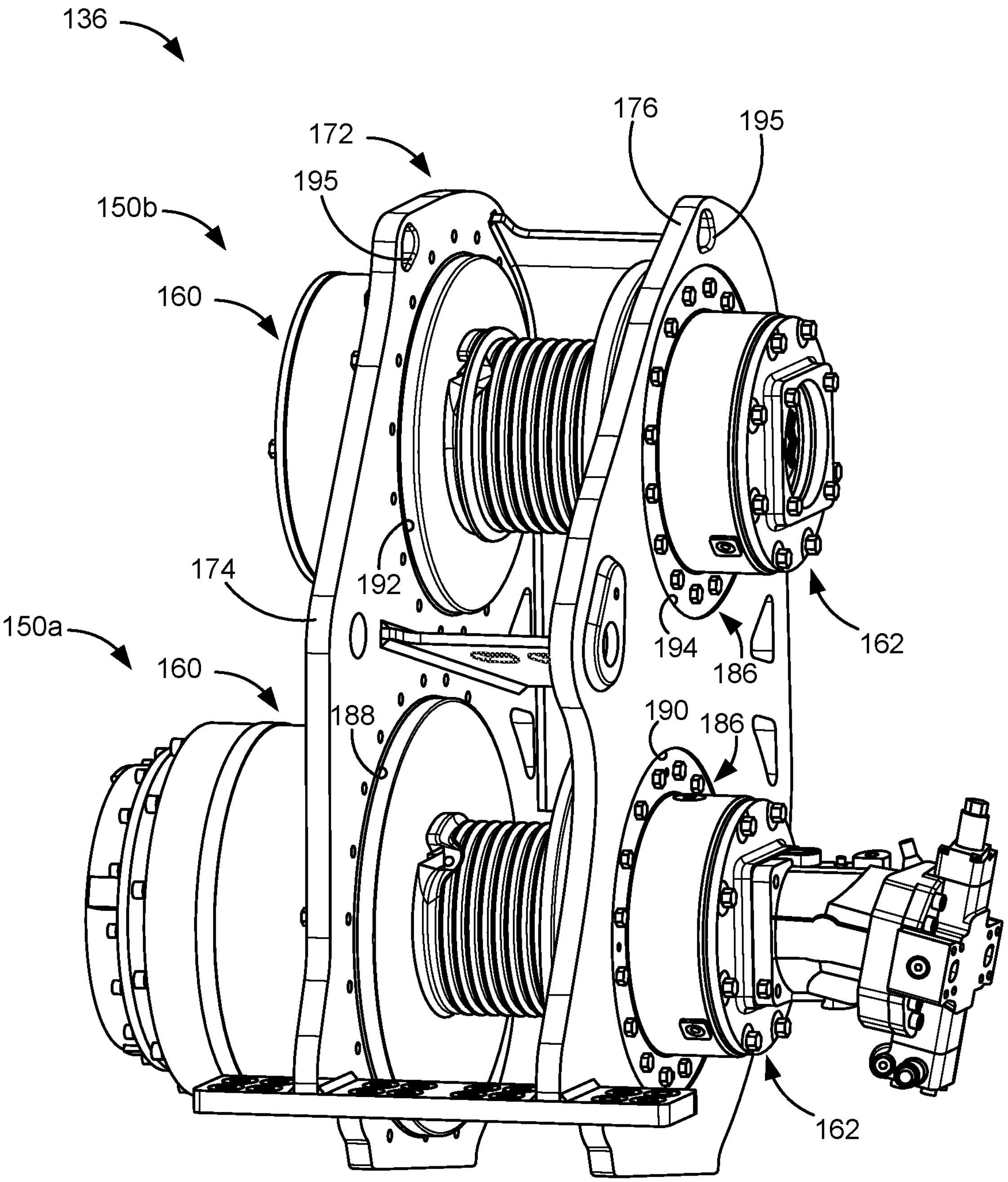
FIG. 4 is a diagram of an example winch assembly in an assembled configuration.

FIG. 4 is a diagram of an example winch assembly 136 in an assembled configuration. The winch assembly 136 includes the frame 172 and one or more winches 150 mounted in the frame 172. As shown, the winch assembly 136 may include a first winch 150*a* and a second winch 150*b*. For example, the first winch 150*a* may be a hook winch (shown with a motor) configured to raise and lower the hook 140, and the second winch 150*b* may be a boom winch (shown without a motor) configured to raise and lower the boom 124. The first winch 150*a* and the second winch 150*b* may be the same type of winch, may be the same size and/or weight, and/or may have the same pulling capacity. Alternatively, the first winch 150*a* and the second winch 150*b* may be different types of winches, may be different sizes and/or weights, and/or may have different pulling capacities. In some implementations, the winch assembly 136 may include only a single winch 150, may include more than two winches 150, and/or may include one or more winches 150 for performing different operations from those described herein.

A winch 150 may be disposed in (e.g., mounted in) the frame 172 through a set of stepped bores 186. For example, the first winch 150*a* may be disposed in (e.g., mounted in) the frame 172 through the first bore 188 of the first plate 174 and the second bore 190 of the second plate 176. As an example, the first flange 166 (not visible in FIG. 4) of the gear housing 160 of the first winch 150*a* may be attached to the first plate 174 (e.g., one or more apertures of the first flange 166 may align with one or more apertures of the first plate 174 and one or more fasteners may extend therethrough), and the second flange 168 (not visible in FIG. 4) of the input housing 162 of the first winch 150*a* may be attached to the second plate 176 (e.g., one or more apertures of the second flange 168 may align with one or more apertures of the second plate 176 and one or more fasteners may extend therethrough). The second winch 150*b* may be disposed in (e.g., mounted in) the frame 172 through the third bore 192 of the first plate 174 and the fourth bore 194 of the second plate 176, and connected to the first plate 174 and the second plate 176 in a similar manner as described above. As shown, a center of gravity of a winch 150 may be outside of the interior area of the frame 172 (e.g., at the gear housing 160 end of the winch 150), thereby facilitating removal of the winch 150 from the frame 172.

In some implementations, the frame 172 may have one or more lifting eyes 195 (e.g., apertures) in the first plate 174 and/or in the second plate 176. For example, a first lifting eye 195 may be in the first plate 174 and a second lifting eye 195 may be in the second plate 176. A lifting eye 195 may be configured to receive a strap, a chain, a cable, or the like, to facilitate lifting of the winch assembly 136.

As indicated above, FIG. 4 is provided as an example. Other examples may differ from what is described with regard to FIG. 4.

Figure 5:
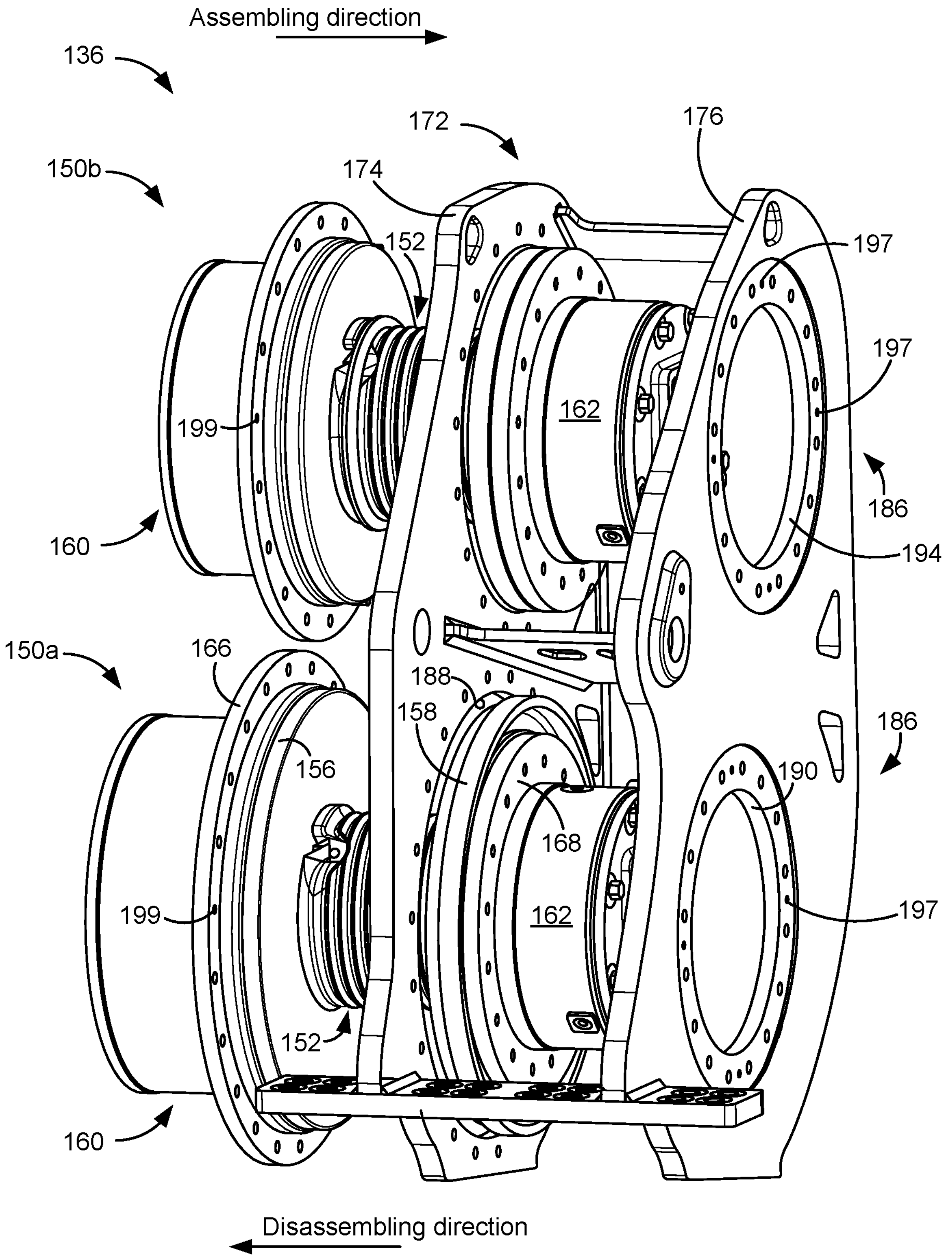
FIG. 5 is a diagram of an example winch assembly in a disassembled configuration.

FIG. 5 is a diagram of an example winch assembly 136 in a disassembled configuration. By using sets of stepped bores 186, a winch 150 may be removed from the frame 172 without disconnecting the winch assembly 136 from the machine 100 and without disassembling the winch 150 (e.g., without disassembling the gear housing 160 and/or the input housing 162 from the drum 152). For example, the winch 150 may be inserted into the frame 172, in an assembling direction, through the set of stepped bores 186 such that the drum 152 is in the interior area of the frame 172 and the gear housing 160 and the input housing 162 extend outside of the frame 172 (as shown in FIG. 4). Continuing with the example, the winch 150 may be removed from the frame 172 (e.g., using a strap secured around the gear housing 160), in a disassembling direction opposite the assembling direction, through the set of stepped bores 186. This is achieved by sizes of the set of stepped bores 186 having a particular relationship with sizes of the drum 152, the gear housing 160, and the input housing 162.

With respect to the winch 150*a*, the second flange 168 of the input housing 162 may be configured to pass through the first bore 188 but to abut the second plate 176 about the second bore 190. For example, a maximum diameter of the second flange 168 (e.g., a maximum diameter of a cross section of the second flange 168) may be less than the diameter of the first bore 188 and greater than the diameter of the second bore 190. Furthermore, the first collar 156 and the second collar 158 of the drum 152 may be configured to pass through the first bore 188. For example, maximum diameters of (e.g., maximum diameters of cross sections of) the first collar 156 and the second collar 158 (e.g., which may be the same diameter or different diameters) may be less than the diameter of the first bore 188. In some implementations, the maximum diameter of the second flange 168 and the maximum diameters of the first collar 156 and the second collar 158 may be equal. In addition, the first flange 166 of the gear housing 160 may be configured to abut the first plate 174 about the first bore 188. For example, a diameter of the first flange 166 may be greater than the diameter of the first bore 188 (e.g., the maximum diameter of the first flange 166 may be greater than the maximum diameter of the second flange 168). In this way, the winch 150*a* may be inserted as a single unit into the frame 172, in the assembling direction, with the second flange 168 and the drum 152 passing through the first bore 188. Similarly, the winch 150*a* may be removed as a single unit from the frame 172, in the disassembling direction, with the drum 152 and the second flange 168 passing through the first bore 188. The winch 150*b* may be configured in a similar manner as described above with respect to the third bore 192 of the first plate 174 and the fourth bore 194 of the second plate 176.

In some implementations, the frame 172 may include one or more pusher holes 197. For example, the second plate 176 may include the pusher holes 197. The pusher holes 197 may be arranged on the second plate 176 (e.g., surrounding the second bore 190 and/or surrounding the fourth bore 194) in alignment with the second flange 168 of a winch 150. A pusher hole 197 may be configured to receive a bolt. For example, the pusher hole 197 may be threaded. As a bolt is inserted and tightened into a pusher hole 197, the bolt will push against the second flange 168 of a winch 150, thereby facilitating separation of the winch 150 from the second plate 176. Moreover, the first flange 166 of a winch 150 may include one or more pusher holes 199, in a similar manner as described above. As a bolt is inserted and tightened into a pusher hole 199, the bolt will push against the first plate 174, thereby facilitating separation of the winch 150 from the first plate 174. In this way, the pusher holes 197, 199 assist in removal of the winch 150*a* and/or the winch 150*b* from the frame 172.

As indicated above, FIG. 5 is provided as an example. Other examples may differ from what is described with regard to FIG. 5.

Figure 6:
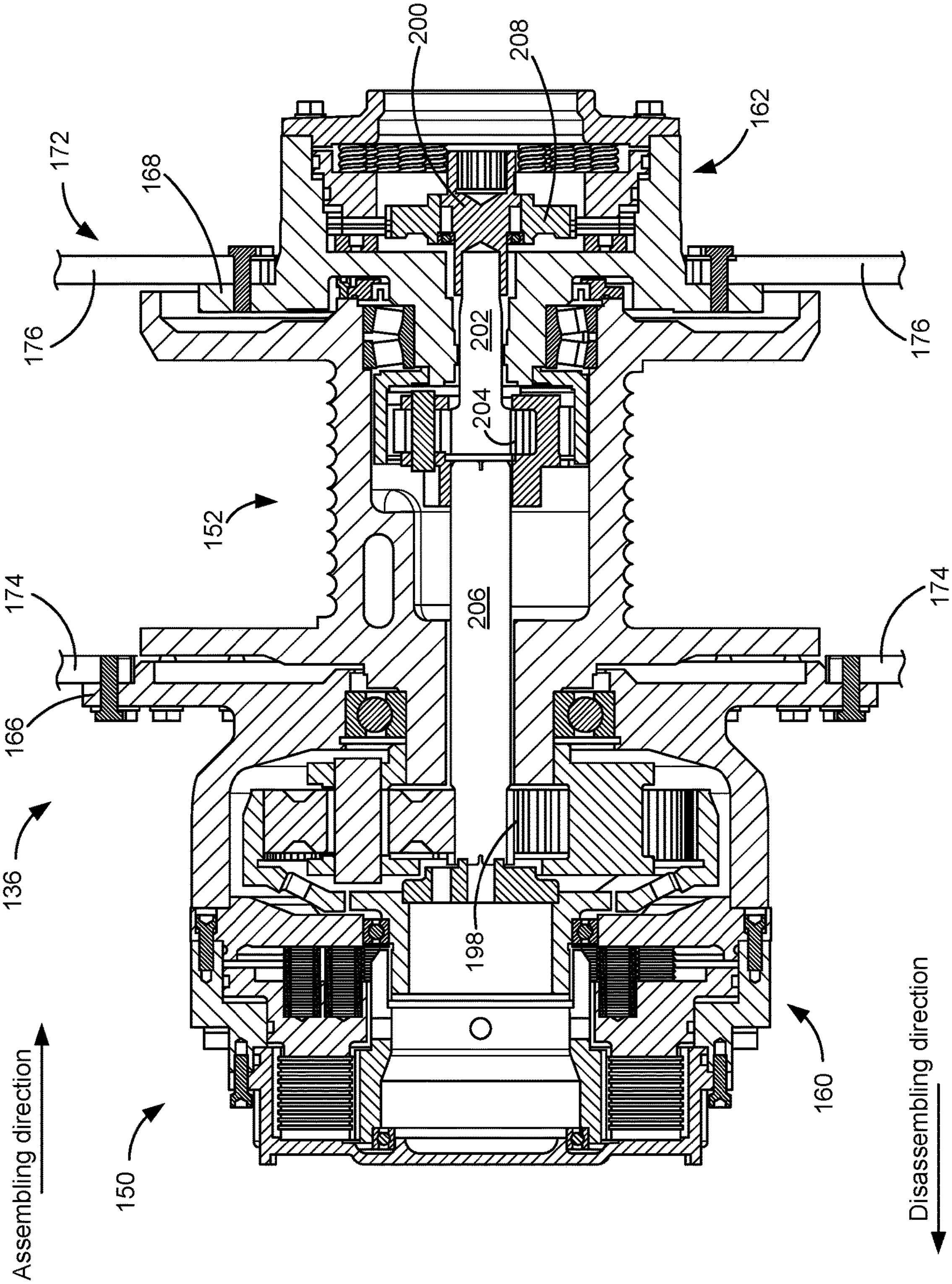
FIG. 6 is a sectional view of an example winch assembly with respect to a single winch.

FIG. 6 is a sectional view of the example winch assembly 136 with respect to a single winch 150.

As shown, the first plate 174 has an inward surface facing the second plate 176 and an outward surface opposite the inward surface. Similarly, the second plate 176 has an inward surface facing the first plate 174 and an outward surface opposite the inward surface. The winch 150 may be inserted into the frame 172 until the first flange 166 of the gear housing 160 contacts the outward surface of the first plate 174 and the second flange 168 of the input housing 162 contacts the inward surface of the second plate 176. In other words, the first flange 166 and the second flange 168 may contact respective surfaces of the first plate 174 and the second plate 176 facing in the same direction (e.g., in the disassembling direction). In this way, the winch 150 may be removed from the frame 172, in that direction, as a single unit (e.g., without disassembling the winch 150).

While the description herein indicates that the gear housing 160 has the larger flange and the input housing 162 has the smaller flange, in some implementations, the gear housing 160 may have the smaller flange and the input housing 162 may have the larger flange. Here, the winch assembly 136 may be inserted into the frame 172 with the gear housing 160 first, and the second flange 168 of the input housing 162 may contact the outward surface of the first plate 174 and the first flange 166 of the gear housing 160 may contact the inward surface of the second plate 176.

As further shown in FIG. 6, the gear housing 160 may include reduction gears 198 (e.g., one or more sets of planetary gears). The input housing 162 may include an input coupling 200 coupled to the motor 164 (not shown in FIG. 6) and coupled to the reduction gears 198. For example, the input coupling 200 may couple the motor 164 to an input shaft 202. The input shaft 202 may couple with reduction gears 204 (e.g., a set of planetary gears) of the drum 152 that are coupled with an output shaft 206 that drives the reduction gears 198. The input housing 162 may also include one or more brake elements 208 (thus, in some examples, the input housing 162 may be referred to as a brake housing). In some implementations, the drum 152, the gear housing 160, and/or the input housing 162 may include a lesser quantity of components from those described herein, may include one or more different components from those described herein, may include one or more additional components from those described herein, and/or one or more components may be arranged in a different manner from that described herein.

As indicated above, FIG. 6 is provided as an example. Other examples may differ from what is described with regard to FIG. 6.

Figure 7:
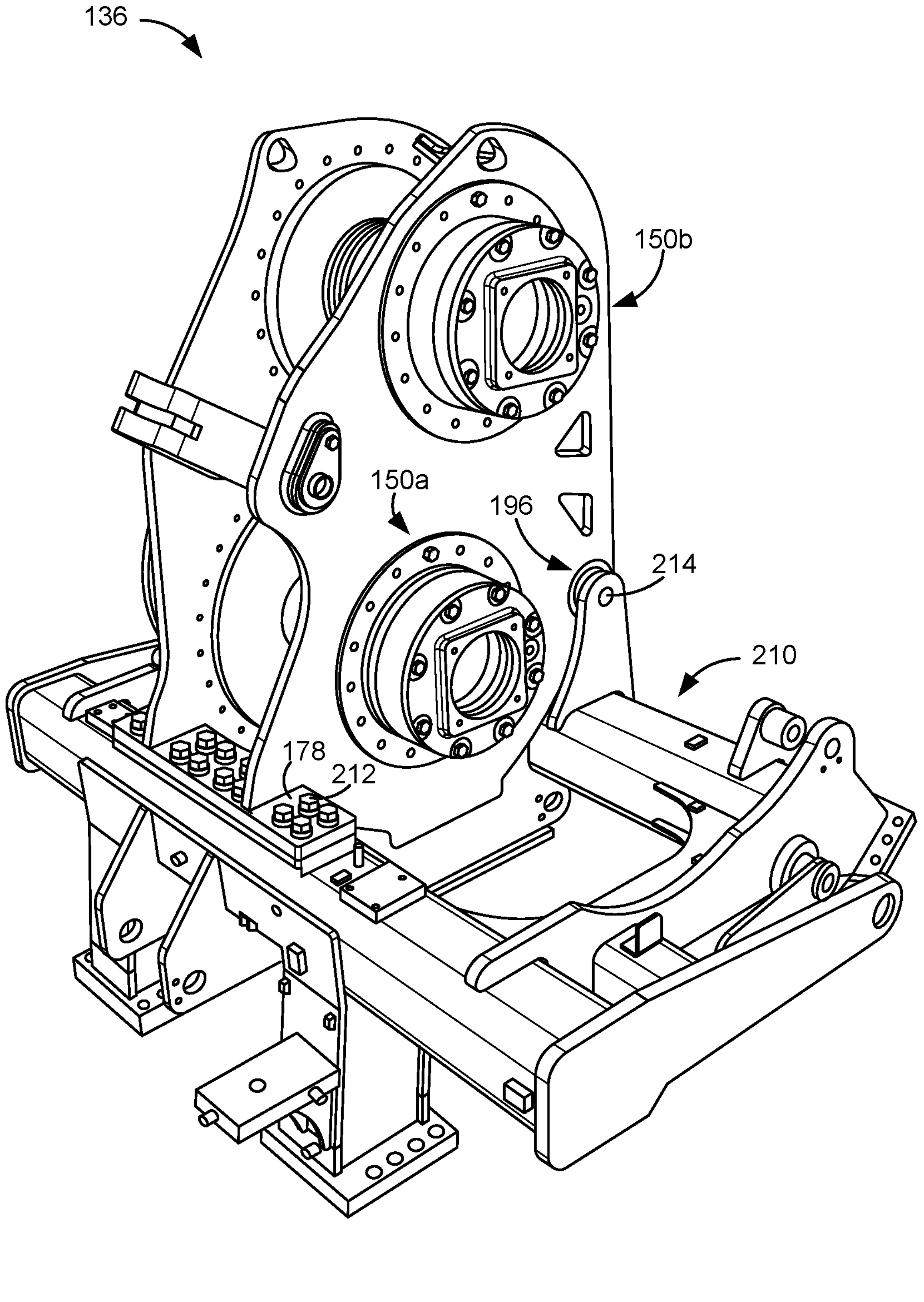
FIG. 7 is a diagram of an example winch assembly mounted to an attachment assembly.

FIG. 7 is a diagram of an example winch assembly 136 mounted to an attachment assembly 210. The attachment assembly 210 may be configured to attach the winch assembly 136 to a machine, such as the machine 100.

The winch assembly 136 may be mounted to the attachment assembly 210 at the mounting plate 178. For example, the mounting plate 178 may receive a plurality of fasteners 212 (e.g., bolts) that attach the frame 172 with the attachment assembly 210. The use of numerous fasteners 212 would otherwise be impractical if disconnection of the winch assembly 136 from the attachment assembly 210 was regularly needed to permit removal of a winch 150. Additionally, or alternatively, the pin aperture(s) 196 may receive one or more pins 214 that attach the frame 172 with the attachment assembly 210. Thus, mounting of the winch assembly 136 to the attachment assembly 210 may be provided by fastener (e.g., bolt) joints as well as pin connections, thereby producing a robust connection with limited play.

As indicated above, FIG. 7 is provided as an example. Other examples may differ from what is described with regard to FIG. 7.

INDUSTRIAL APPLICABILITY

The winch assembly described herein may be used with any machine that uses a winch for hoisting, pulling, towing, or the like. For example, the winch assembly may be used with a pipelayer machine that utilizes one or more winches for raising and lowering a boom of the pipelayer machine and/or for raising and lowering a hook suspended from the boom. As described herein, the winch assembly includes a frame having a set of stepped bores and a winch supported by the frame in the set of stepped bores. The stepped bores are sized such that the winch can be inserted as a single unit into the frame through the stepped bores, as well as removed as a single unit from the frame through the stepped bores. In this way, the winch assembly facilitates removal of a winch from the frame without specialized tooling, without disconnecting the winch assembly from the machine, and without disassembling the winch. Accordingly, the winch can be repaired or replaced with improved speed and efficiency, thereby minimizing machine downtime.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A winch assembly, comprising:
a frame comprising a first plate and a second plate separated from the first plate,
the frame having a set of stepped bores including a first bore in the first plate and a second bore, co-axial with the first bore, in the second plate,
the first bore larger than the second bore;
a winch disposed in the frame through the first bore and the second bore, the winch comprising:
a first housing extending through the first bore and with a first flange extending from the first housing, the first flange connected at an outward surface of the first plate;
a second housing extending through the second bore and with a second flange extending from the second housing, the second flange connected at an inward surface of the second plate; and
a drum between the first housing and the second housing.

2. The winch assembly of claim 1,
wherein the first housing includes reduction gears and the second housing includes an input coupling coupled to the reduction gears, and
wherein the winch further comprises a motor connected to the second housing and coupled to the input coupling.

3. The winch assembly of claim 1,
wherein a maximum diameter of the drum is less than a diameter of the first bore.

4. The winch assembly of claim 1,
wherein a maximum diameter of the first flange is greater than a maximum diameter of the second flange.

5. The winch assembly of claim 1,
wherein a maximum diameter of the first flange is greater than a diameter of the first bore.

6. The winch assembly of claim 1,
wherein a maximum diameter of the second flange is less than a diameter of the first bore and greater than a diameter of the second bore.

7. The winch assembly of claim 1,
wherein the frame has an additional set of stepped bores including a third bore in the first plate and a fourth bore, co-axial with the third bore, in the second plate, the third bore larger than the fourth bore, and
wherein the winch assembly further comprises:
an additional winch disposed in the frame through the third bore and the fourth bore.

8. The winch assembly of claim 1, further comprising:
a tie element connecting the first flange of the first housing, or the second flange of the second housing, and a collar of the drum.

9. A winch, comprising:
a gear housing with a first flange of a first maximum diameter extending from the gear housing,
the gear housing including reduction gears and configured to extend through a first bore of a first plate of a frame;
an input housing with a second flange of a second maximum diameter, different from the first maximum diameter, extending from the input housing,
the input housing including an input coupling, coupled to the reduction gears, and configured to extend through a second bore of a second plate of a frame, the second bore being coaxial with the first bore;
a drum, between the gear housing and the input housing, having a barrel, a first collar at a first end of the barrel, and a second collar at a second end of the barrel; and
a tie element connecting the second flange of the input housing and the second collar of the drum.

10. The winch of claim 9,
wherein the first maximum diameter of the first flange is greater than the second maximum diameter of the second flange.

11. The winch of claim 9,
wherein the first maximum diameter of the first flange is less than the second maximum diameter of the second flange.

12. The winch of claim 9, further comprising:
a motor coupled to the input coupling of the input housing.

13. The winch of claim 9,
wherein the tie element comprises a bolt.

14. A pipelayer machine, comprising:
a boom;
a hook suspended from the boom; and
a winch assembly, comprising:
a frame comprising a first plate and a second plate separated from the first plate, the frame having:
a first set of stepped bores including a first bore in the first plate and a second bore, co-axial with the first bore, in the second plate, the first bore larger than the second bore, and
a second set of stepped bores including a third bore in the first plate and a fourth bore, co-axial with the third bore, in the second plate, the third bore larger than the fourth bore;
a hook winch disposed in the frame through the first set of stepped bores, the hook winch configured to raise and to lower the hook, the hook winch comprising a first housing extending through the first bore and a second housing extending through the second bore; and
a boom winch disposed in the frame through the second set of stepped bores, the boom winch configured to raise and to lower the boom, the boom winch comprising a first housing extending through the third bore and a second housing extending through the fourth bore.

15. The pipelayer machine of claim 14,
wherein the frame further comprises:
a mounting plate connecting the first plate and the second plate,
the mounting plate having a plurality of apertures through the mounting plate configured to receive fasteners to mount the winch assembly to the pipelayer machine; and
one or more pin apertures in the first plate or in the second plate configured to receive pins to mount the winch assembly to the pipelayer machine.

16. The pipelayer machine of claim 14,
wherein the hook winch further comprises:
a first flange extending from the first housing;
a second flange extending from the second housing; and a drum between the first housing and the second housing.

17. The pipelayer machine of claim 16, wherein a maximum diameter of the drum is less than a diameter of the first bore.

18. The pipelayer machine of claim 16, wherein a maximum diameter of the first flange is greater than a maximum diameter of the second flange.

19. The pipelayer machine of claim 16, wherein a maximum diameter of the first flange is greater than a diameter of the first bore.

20. The pipelayer machine of claim 16, wherein a maximum diameter of the second flange is less than a diameter of the first bore and greater than a diameter of the second bore.

* * * * *